United States Patent [19]

Komadina

[11] Patent Number: 4,933,078
[45] Date of Patent: Jun. 12, 1990

[54] SORPTION VESSEL WITH INTERNAL INTERSTAGE SCREENING VESSEL

[75] Inventor: James J. Komadina, Elko, Nev.

[73] Assignee: Newmont Gold Company, Carlin, Nev.

[21] Appl. No.: 264,600

[22] Filed: Oct. 31, 1988

[51] Int. Cl.⁵ .................... B01D 15/02; B01D 33/30
[52] U.S. Cl. .................................. 210/219; 210/258; 210/388; 210/416.1; 210/688; 210/263; 209/235; 209/269; 209/272; 209/354; 266/168
[58] Field of Search ............... 210/198.1, 219, 684, 210/688, 416.1, 258, 388, 263; 75/185, 106, 118 R; 423/25, 29; 266/101, 168, 170; 209/235, 268, 269, 272, 250, 353, 354

[56] References Cited

U.S. PATENT DOCUMENTS

| | | | |
|---|---|---|---|
| 2,743,154 | 4/1956 | Kaufman et al. | 23/14.5 |
| 2,808,928 | 10/1957 | Kaufman et al. | 209/17 |
| 3,554,516 | 1/1971 | Denny et al. | 266/22 |
| 3,606,290 | 9/1971 | Ransom | 266/22 |
| 4,033,865 | 7/1977 | Derrick, Jr. | 209/275 |
| 4,065,382 | 12/1977 | Derrick, Jr. | 209/313 |
| 4,133,746 | 1/1979 | Dopson | 209/1 |
| 4,173,519 | 11/1979 | Parker et al. | 204/110 |
| 4,188,208 | 12/1979 | Guay | 75/105 |
| 4,251,352 | 2/1981 | Shoemaker | 209/45 |
| 4,289,532 | 9/1981 | Matson et al. | 75/105 |
| 4,370,858 | 2/1983 | Awerbuch et al. | 60/641.5 |
| 4,384,889 | 5/1983 | Wiewiorowski et al. | 75/101 R |
| 4,416,774 | 11/1983 | Taylor | 210/236 |
| 4,528,166 | 7/1985 | McDougall | 423/23 |
| 4,552,589 | 11/1985 | Mason et al. | 75/105 |
| 4,575,421 | 3/1986 | Derrick et al. | 209/397 |
| 4,578,163 | 3/1986 | Kunter et al. | 204/110 |
| 4,613,432 | 9/1986 | Racine et al. | 209/254 |
| 4,692,240 | 9/1987 | Arbuthnot | 209/254 |
| 4,754,953 | 7/1988 | Brison et al. | 266/101 |

OTHER PUBLICATIONS

Bulletin, SALA Vertical Pump Type SPV.
P. A. Laxen, "Interstage Screen on the Adsorption Circuit of an 'In-Pulp' Process".
J. J. Komadina et al., "Carbon-in-Pulp Interstage Screening Using Submerged High Frequency Screens" SME Annual Meeting, Jan., 1988.
Gold & Silver Recovery Innovations, Phase III, vol. 7, Ch. 42, "CIP Interstage Screens," pp. 4079-4184.
Gold & Silver Recovery Innovations, Phase III, vol. 7, Ch. 43, "Interstage Carbon Transfer for CIP," pp. 4187-4202.
E. F. Legros, "Handling Granular Activated Carbon in the Gold Industry."
P. R. Bailey, "Design of the Adsorption Section" National Institute for Matallurgy (South Africa) Carbon School 1985.
R. L. Reinhofer, "The Design and Development of the Derrick CIP/CIL Interstage Screen" Intermountain Mining and Processing Operators Symposium, Elko; Nevada, Nov. 2-4, 1988.

Primary Examiner—Richard V. Fisher
Assistant Examiner—Cynthia L. Nessler
Attorney, Agent, or Firm—Pennie & Edmonds

[57] ABSTRACT

A sorption vessel including a tank for retaining a pulp of an aqueous slurry and a sorbent at a predetermined liquid pulp level therein; and an interstage screening system disposed within the tank and at least partially submerged beneath the predetermined pulp level. The interstage screening system includes a housing for isolating the system from the pulp, thereby providing a hydraulic differential between the predetermined pulp level and the screening system; a conduit for selectively introducing the pulp onto the screen member, the pulp being urged through the conduit by the hydraulic differential; and at least one screen member disposed within the housing for selectively and continuously separating the sorbent from the pulp.

29 Claims, 5 Drawing Sheets

SORPTION VESSEL WITH INTERNAL INTERSTAGE SCREENING VESSEL

BACKGROUND OF THE INVENTION

1. Field of the Invention

The present invention relates to a sorption vessel having an internal interstage screening system. The sorption vessel of this invention has particular utility for sorbing gold values from a slurry containing the same.

2. Description of the Background Art

Precious metals, such as gold and silver, and other metals, such as copper, iron and nickel, are typically contained in ore materials when mined. Metal-containing ores are typically processed in accordance with one or more known techniques so that the metals, especially precious metals, can be separated and extracted from the mined ore.

One known method of recovering precious metals or other metals from metal-containing ores occurs in a carbon-in-pulp system wherein activated carbon, usually in the form of activated charcoal, is mixed with a slurry of the ore in a cyanide solution. The carbon remains in contact with the slurry for a time sufficient to permit the gold and silver to become adsorbed by the carbon and, thereafter, the carbon is separated from the residue, typically by some type of interstage screen assembly. The carbon particles are generally larger than the finely ground ore particles which permits the screening step to be accomplished with relative ease. A carbon-in-pulp system utilizes a plurality of mechanically or pneumatically agitated tanks arranged in series, usually 4 to 6. Each tank generally contains activated carbon having a different amount of gold adsorbed thereon; with the first tank having the highest and the last tank having the lowest. A slurry of a finely ground ore and the alkaline cyanide metal complex solution, is introduced into the first tank, while the carbon is advanced countercurrently to the flow of slurry from the last tank to the first tank. The slurry is agitated with the carbon adsorbent in the tank and the carbon adsorbs the cyanide metal complex as the slurry and the carbon adsorbent, i.e., the pulp, is agitated. The pulp is sequentially passed through the series of the pneumatically or mechanically agitated tanks so that most of the cyanide metal complex is adsorbed by the carbon.

After passing through the series of tanks, the processed tailings are discarded. As stated above, the carbon containing the adsorbed cyanide metal complex can be sequenced through the tanks in reverse order from the ore slurry. After the adsorbent has passed completely through the system, it has become "loaded" with the adsorbed metal complex. The loaded adsorbent is then chemically processed to remove most of the metal. The stripped adsorbent is then reactivated and then returned to the carbon-in-pulp system.

Another known method of recovering metals from metal-containing ores occurs in a carbon-in-leach system. The carbon-in-leach system is similar to the carbon-in-pulp system. The primary difference between the carbon-in-pulp system and carbon-in-leach system is that in the former, there are mixing tanks for cyanidation leaching prior to the carbon adsorption stage. In a carbon-in-leach system, cyanidation is conducted in the presence of carbon.

A further method of recovering metals from metal-containing ores occurs in a resin-in-pulp system. Generally, in a resin in pulp system, a leached metal-containing ore pulp is exposed to a resin, typically employed as moderately coarse particles, in a series of agitator tanks. The particular resin is, thereafter, separated from the pulp with the metal complex adsorbed thereon and, ultimately, the metal complex is removed from the resin to recover quantities of the particular metal present in the ore.

A detailed review of the screening systems currently in use for separating either the carbon or resin adsorbents from the slurry of a pulp can be found in the following art: P. A. Laxen, "Interstage Screens On The Adsorption Circuit of An 'In-Pulp' Process" and Gold & Silver Recovery Innovations, "CIP Interstage Screens", Phase III, Vol. 7, Ch. 42, pp. 4079-4184. Initial carbon-in-pulp ("CIP") plants utilized external vibrating screens over which the pulp with entrained carbon was pumped by air lifts from the bottom of the adsorption tanks. Each tank utilized a number of external vibrating screens to which external air lifts on the side of each tank lifted pulp plus carbon onto the screens. The screen pulp would flow by gravity to the next tank while the carbon on the screen flows back to the tank from which it came except periodically when it is diverted to the next tank countercurrent to the pulp flow. The disadvantages associated with this type of system include (1) the capital cost of external vibrating screens, air lifts and compressors for air supply; (2) additional costs of supporting structures for the screens; (3) compressed air and screen maintenance are relatively high for a large scale plant with the system being much more energy intensive than it needs to be; (4) the large amount of air injected into the pulp results in substantial carbon scaling; (5) the efficiency of the system is low since a portion of the carbon is continuously not in contact with pulp and therefore not absorbing metal values therefrom; and (6) excessive operator manpower required on large plants for monitoring the system for ruptures and/or replacement of the screen media.

To upset these disadvantages, systems have been installed which utilize both external and internal screens, with the external screens being used for carbon transfer only. The majority of the pulp (about two-thirds) flows to internal air cleaned screens while the remainder of the pulp is continuously pumped by a submergible pump to the external screens with the carbon either being returned to the leach tanks or transferred to the next tank as required for countercurrent carbon transfer. The pulp from the external screen, again one-third of the total, flows continuously to the next tank.

In about 1982, a new type of screen evolved, these known has the EPAC (equal pressure air cleaned) screens. By damming the pulp flow on the downstream side of the screen, the hydrostatic pressure is equalized on both sides of the screen and is not as readily blinded by carbon particles pinned to the screen surface. This simple technique increases the screen capacity of a screen panel per unit of length by a factor of 10 or more. An illustration of this type of screen is shown in U.S. Pat. No. 2,808,928. A wide variety of types, sizes and configurations of EPAC screens is known in the prior art. Each of these systems has its own attendant disadvantages mostly relating to the difficulties in keeping the screen clean of carbon build up along with the difficulties of achieving high throughput. In addition, the quantities of air required and the operational aspect for use of such air create further disadvantages for this type of system.

One improvement on the EPAC screens is known as KAMBALDA screens. These screens were able to dispense with the air cleaning system by mounting the screen horizontally in an upper portion of the tank and by installing an agitator blade beneath the screen in a manner such that pulp is directed against the screen with the agitation caused by the blades continually moving the carbon away from the screen to prevent build up. The screened pulp is removed from the top of the tank and is introduced into the subsequent tank in the lower portion thereof with the mixture in the second tank causing the pulp to flow upwardly and onto the next screen. The agitator blade is known as a sweeper arm and is mounted a few inches away from the bottom of the screen. While the total energy requirements for this type of screen is less than conventional EPAC screens, the disadvantages for this system relate to the extensive amount of structural steel required above the tank to support the agitator with its sweeper, as well as the screens located thereabove.

Another improvement on the EPAC screens was made at North Kalgurli Mines and is known as the NORKAL screen. This screen consist of a cylindrical screen basket along with pedals which rotate along its circumference to sweep away carbon build up. Screened pulp flowing into the cylindrical screen basket is drained through an out-flow and is directed to the next tank. The improvement of this type of arrangement relates to an increase in throughput with a corresponding decrease in energy necessary to achieve that throughput. The disadvantages of such a system are similar to those identified above for the KAMBALDA screens.

As noted in the articles cited above, the shortcomings associated with known interstage screening installations are their energy intensive operational requirements, which are predominantly ascribed to the compressed air requirements; the high maintenance and operational costs, since, in order to advance the adsorptive species on a continuous or semi-continuous basis, as is necessary, the internal launder or mechanical interstage screening system must pump the total pulp (i.e., slurry and carbon); the low throughput per unit area; and the absence of any separation or concentration of the adsorptive species from the pulp. Additionally, due to the abrasive nature of the adsorptive species, the conventional wire or cloth interstage screens have a relatively short effective life which necessitates constant inspection and replacement, else the adsorptive species and, hence, the adsorbed metals, remain in the pulp and cannot be recovered.

Other problems associated with prior art installations relate to carbon transfer pumps used in such installations and, more specifically, the deleterious effect they have on the sorbent.

SUMMARY OF THE INVENTION

The invention relates to a sorption vessel including a tank for holding a pulp including an aqueous slurry and a sorbent, the pulp being maintained at a predetermined level in the tank, and a screening system disposed with the tank and being at least partially submerged beneath the predetermined pulp level. The screening system includes a housing for isolating the screening system from the pulp, thereby providing a hydraulic differential between the predetermined pulp level and the screening system; at least one screen member disposed within the housing for selectively and continuously separating the sorbent from the slurry; and means for directing the pulp onto the screen member as the pulp is displaced towards the screening system by the hydraulic differential.

This vessel may utilize a pump for removing one of the sorbent or the pulp from the tank. Also, means for agitating the pulp may be used to facilitate contact between the sorbent and the slurry, thereby increasing the degree of sorption of metal values from the slurry by the sorbent. Advantageously, the vessel has means for introducing one of additional slurry or additional sorbent thereinto the vessel to maintain the pulp at its predetermined level.

In one embodiment, the screening system generally includes a plurality of screen members which are angularly disposed in the housing with respect to the predetermined pulp level, with the screening having means for vibrating the screen members to facilitate separation of the sorbent from the slurry. Alternatively, the screen member may comprise a continuous linear screen. In either case, the pulp directing means further utilizes a valve means for selectively introducing pulp into the screening system, and the tank includes at least one baffle to assist in the direction of movement of the pulp in the tank. If desired, a plurality of screening systems can be used.

A preferred embodiment of the pulp directing means is a conduit, one end of which extends to a lower portion of the tank and directs the pulp to the screening system. The opposite end of the conduit may include a distribution box member for uniformly distributing the pulp into the screening system. The separated slurry removing means generally comprises a drainage member extending from a lower portion of the screening system housing through a wall of the tank.

The vessel itself may utilize means for agitating the pulp to facilitate contact between the sorbent and the aqueous slurry, thereby increasing the degree of sorption of metal values from the slurry by the sorbent. The vessel may also include means for introducing additional slurry, preferably into an upper portion of the tank, while one or more spargers may be used to introduce air into the pulp.

DESCRIPTION OF THE PREFERRED EMBODIMENTS

Figure 1:
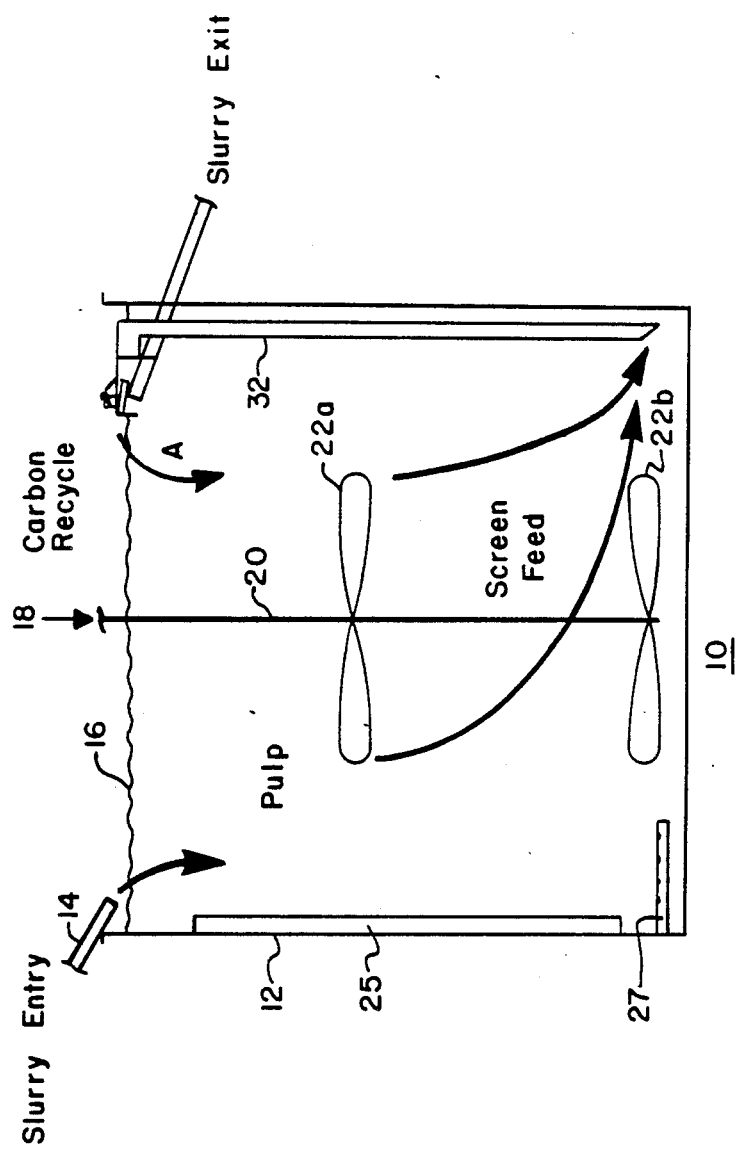
FIG. 1 is a schematic illustration of one vessel used in accordance with the present invention.

The general process of recovering gold from a gold bearing ore employing a combined cyanidation and adsorption treatment is described in U.S. Pat. No. 4,188,208, the entire content of which is incorporated herein by reference. While the description in that U.S. Patent relates particularly to gold recovery, as does the description provided hereinbelow, the underlying theory is used in processes for recovering silver, iron, copper, nickel and other metals. The recovery of each of these metals from a mined ore is within the scope of the present invention.

An aqueous slurry is prepared by grinding a crushed metal-containing ore to about 50% to about 70% minus 200 mesh and mixing the ground ore with a sufficient amount of water so that it forms a slurry with about 40 to about 50% solid in water. Alternatively, the ore can be wet grinded to form the slurry. Preparation of the slurry in this manner is offered as an illustration; however, any of the particular techniques for forming the slurry which are known to those skilled in the art are available for use and are contemplated by the method of this invention.

The ore may optionally be subjected to oxidation treatment prior to cyanidation treatment to enhance the quantities of metal recovery by employing any pre-oxidation technique known to those skilled in the art.

The slurry is then treated with a substance, such as cyanide, and in a manner such that a metal complex is formed between the particular substance used for treating the slurry and the metal present in the ore, which metal complex is capable of being adsorbed by the particular adsorbent employed. For purposes of this description, a method for recovering gold from a gold-bearing ore in a carbon-in-pulp installation is described. It is to be fully understood, however, that the method and system of this invention are applicable to the recovery of other metals in carbon-in-pulp, carbon-in-leach and resin-in-pulp installations. Of course, appropriate substitutions of components which are apparent to those skilled in the art must be considered and, if necessary, implemented. Thus, in a process for recovering gold from an ore containing the same, the gold is leached from the slurry in the form of a cyanide complex, specifically, an aurocyanide complex. For instance, sodium hydroxide and sodium cyanide, or potassium hydroxide and potassium cyanide, are added to the aqueous pulp in amounts such that the pulp contains from about 0.1 to 10% by weight of lime or an alkali metal hydroxide and from about 0.1 to 1.0% by weight of the alkali metal cyanide. In addition, up to about 10% by weight of sodium carbonate or potassium carbonate may also be added to the pulp. A resulting cyanide complex is produced which can be adsorbed by certain adsorbent solids, such as, activated carbon.

The adsorptive properties of activated carbon are ascribed to its large internal surface area, its pore size distribution, and the external surface area. Activated carbon functions by adsorption due to the imbalance of the forces upon the carbon atoms constituting the surface of the pore walls. Carbon is generally selective for gold and silver cyanide complexes, however, other complexes of copper, iron or nickel may be adsorbed. The carbon can be obtained from any conventional source, such as, for instance, dense woods, nut shells, fruit pits or coke derived from anthracite coal or petroleum products, and can be activated in any conventional manner. Preferably, the carbon is soaked in water having a pH of about 11 for at least about 4 hours prior to being added to the pulp. For reasons explained hereinbelow, the size of the carbon particulate should be greater than the size of the pores of the screen employed in the interstage screening phase. It is therefore preferably to employ carbon particulate having a mesh size of about 6 to about 16.

While the method of the present invention may be practiced in one stage, that is, in one tank or vessel, it can be practiced in a plurality of tanks arranged in series, with each tank having one or more interstage screening systems. Preferably, the invention is carried out in 4 to 6 tanks, with the most preferred being a 6 tank arrangement.

Accordingly, the following description relates to a single sorbent vessel of the present invention, it being fully understood, however, that two or more of the described vessels may be used in accordance with this invention.

Referring now to the drawings, particularly to FIG. 1, illustrated is the sorption vessel of the present invention, which is generally designated as reference numeral 10. Sorbent vessel 10 includes a tank 12 which includes the slurry described hereinabove and a sorbent, such as, the activated carbon described above. The admixture of aqueous slurry and sorbent will hereinafter be referred to as a pulp. It is to be further understood that the slurry includes the cyanidation reagent. Inasmuch as slurry is continuously introduced into tank 12 via slurry entry means 14 and further since sorbent is continuously introduced into tank 12 at the proximity of arrow A the pulp is maintained in the tank at a predetermined level, which level is represented as reference numeral 16. Although not shown, slurry entry means 14 can be a downcomer which has a first end proximate or associated with a source of the slurry and a second end disposed within tank 12.

Sorption vessel 10 further includes agitation means 18 which, when actuated, agitates the pulp to facilitate contact between the sorbent and the slurry, thereby increasing the degree of sorption of metal values from the slurry by the sorbent. In a preferred embodiment, agitation means 18 includes a rotatable shaft 20 and two impeller blades 22a, 22b associated therewith. It is to be understood, however, that other agitation means may be employed to facilitate contact between the sorbent and the slurry.

Sorption vessel 10 can optionally include one or more baffles 25 to direct the movement of the pulp within the tank to desired locations. Also, a sparge pipe 27 can be used to introduce air or other oxidizing agent into the slurry for proper operation of the process, as will be more clearly understood from the description provided below.

Figure 2:
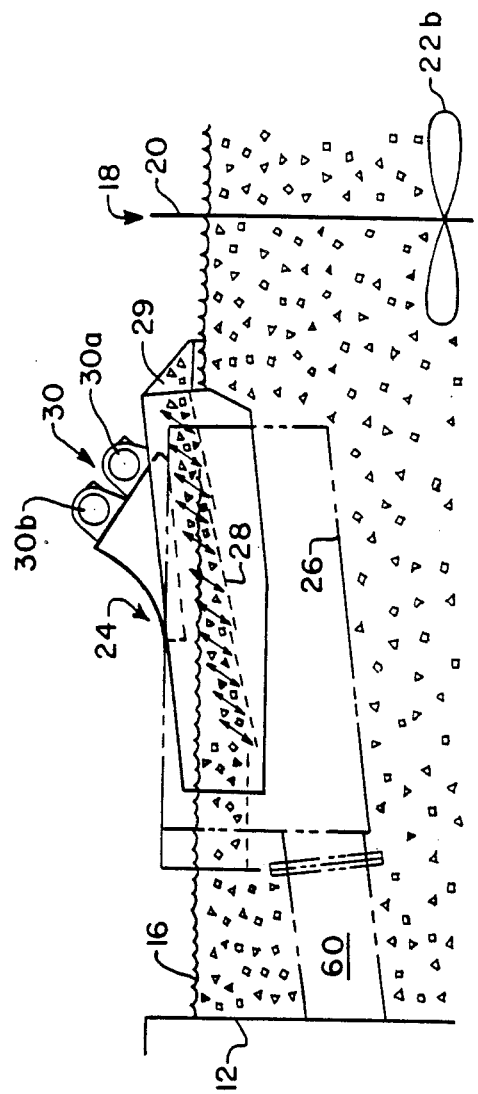
FIG. 2 is a side view of the interstage screening system used in accordance with the present invention with the internal structural components thereof being exposed and illustrating pulp disposed therein.

Sorption vessel 10 further includes a screening system 24 that is disposed within tank 12. Referring now to FIG. 2, screening system 24 is illustrated in greater detail and, as shown, is at least partially submerged beneath the predetermined pulp level 16. The extent to which screening device 24 becomes submerged in the pulp is determined by the liquid level of the pulp and the amount of pulp introduced into screening device 24. Screening system 24 isolate pulp disposed therein from the pulp contained within tank 12 by way of a housing 26, which provides a hydraulic differential between the predetermined pulp level 16 and screening system 24. As pulp is continuously introduced into screening system 24, sorbent is selectively and continuously separated from the slurry by way of screen members 28. Screen member 28 can include one or more individual screen panels or, alternatively, screen member 28 can include a continuous linear screen, such as, for example, the one illustrated in U.S. Pat. No. 4,692,240, the entire content of which is incorporated herein by reference. In a most preferred embodiment, screen member 28 is angularly disposed with respect to pulp level 16. Preferably, screen 28 is vibrated by vibration means, such as the dual motor arrangement 30. However, a single motor arrangement is also within the scope of this invention. Motors 30 can also be used to impart motion to a continuous linear screen in the event that such an embodiment is opted for.

Screen member 28 has openings ranging in size, for example, from about 0.1 mm to about 1 mm, with a preferred size of 0.7 mm for separating activated carbon in a CIP installation. Screen member 28 is most preferably fabricated from urethane to avoid the abrasive effect of carbon particulate.

Screening system 24 has developed from this technology and now is available from Derrick Manufacturing Corporation, Buffalo, N.Y. as their Flow Line Cleaner.

Referring once again to FIG. 1, sorption vessel 10 further includes means for directing pulp onto screen member 28, whereby the pulp is displaced toward screening system 24 and, hence, screen member 28 by way of the aforedescribed hydraulic differential. For instance, the means for directing the pulp can include conduit means such as upcomer 32. As illustrated, upcomer 32 has a lower end disposed within tank 12 at a position below pulp level 16, preferably at the bottom portion of tank 12, and further has an upper end disposed within the proximity of screening system 24. Alternatively, a baffle (not shown) can be used to direct pulp into screening system 24. The degree of pulp to be directed onto screen member 28 can be regulated by a feed weir 34 as shown in FIG. 3, it being understood that feed weir 34 can preclude entry of pulp into screening system 24 or can permit entry of pulp by way of valve 36, associated with feed weir 34, which permits the opening and closing of feed weir 34.

Conduit means 32 can further include a distribution box 33 associated with the upper portion thereof and within the proximity of screening system 24 to uniformly distribute pulp into screening system 24.

Additionally, tank 12 can be provided with one or more spargers (not shown) for introducing air into the pulp for reasons well understood by the skilled artisan.

Figure 3:
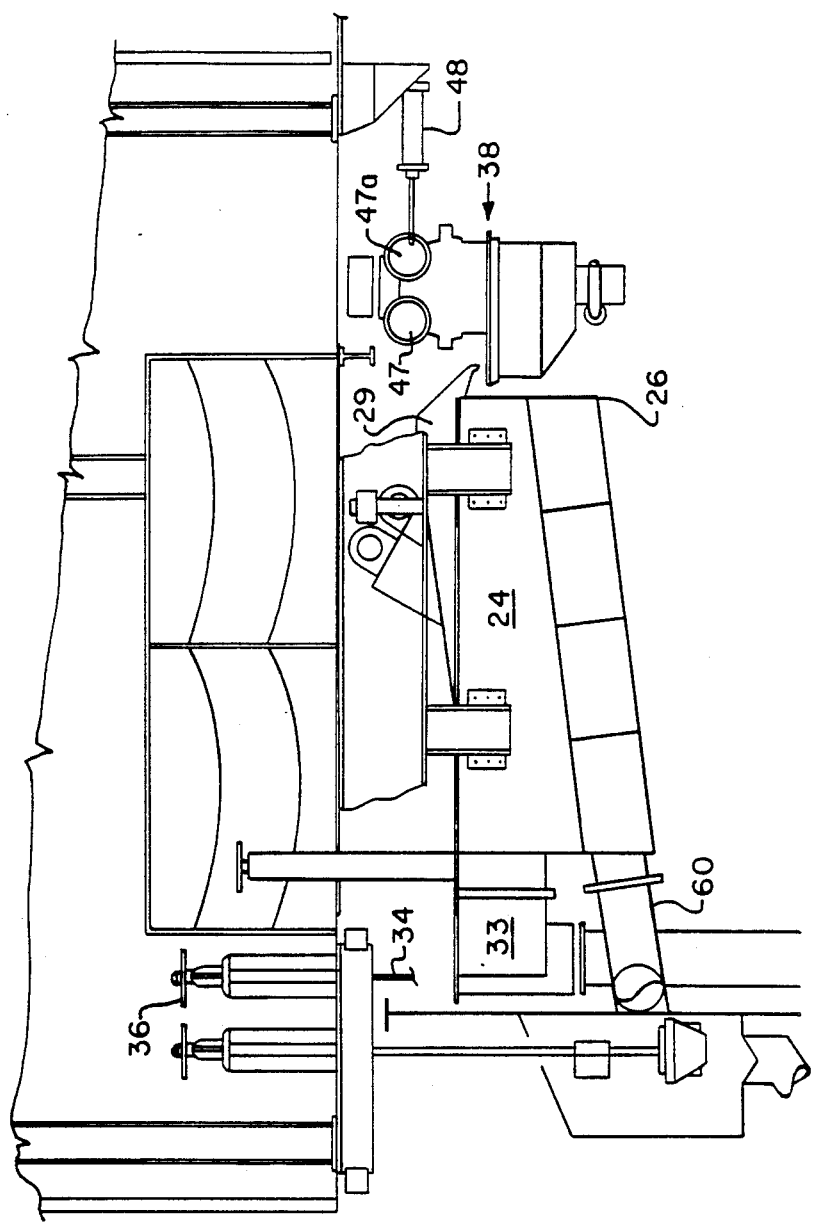
FIG. 3 is a schematic representation of the cooperative arrangement of the interstage screening system and the pump of the present invention.
Figure 4:
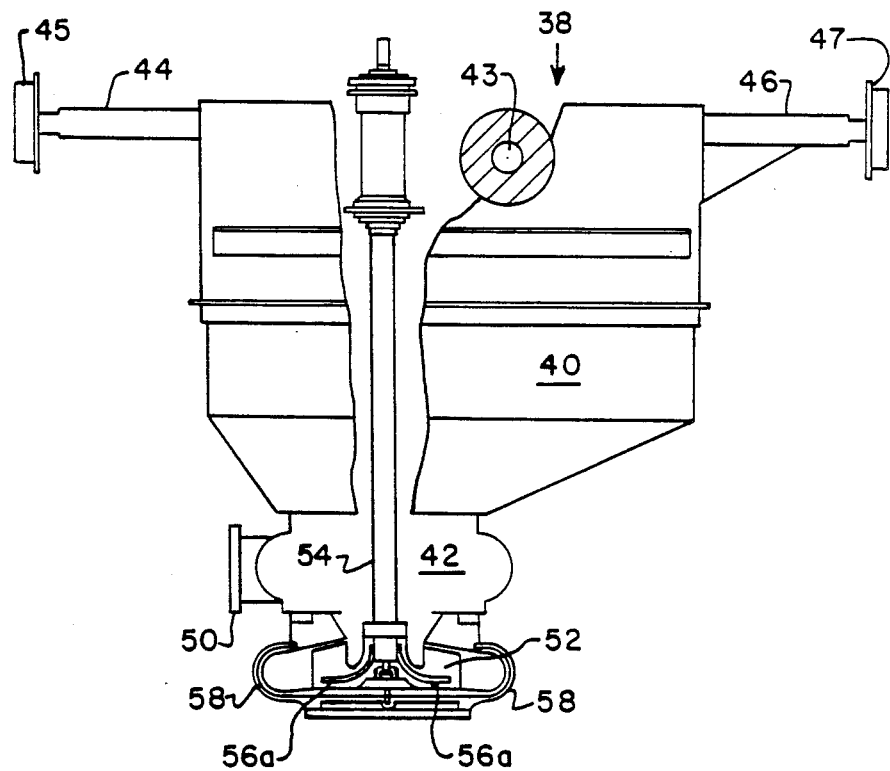
FIG. 4 is a perspective view of the pump of the present invention with a portion cut away to expose the agitation means.
Figure 5:
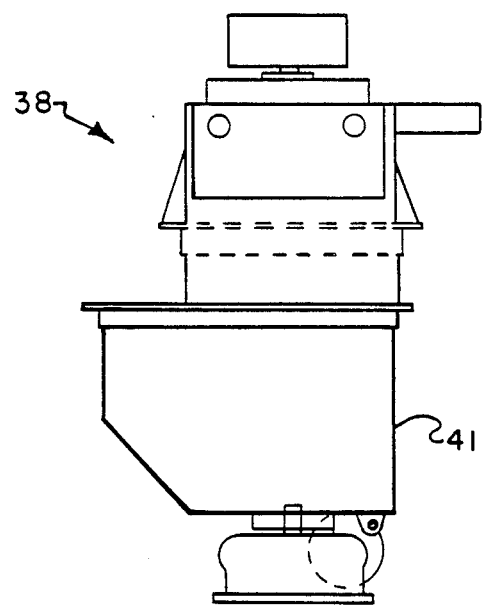
FIG. 5 is a side view of the pump of the present invention.

Referring to FIG. 3, sorption vessel 10 can further include a pump 38 for removing sorbent and/or pulp from tank 12 via screening system 24. Referring now to FIGS. 3 to 5, pump 38, which is a vertical pump, includes an upper chamber 40 for receiving pulp or, for that matter, any type of solid-liquid dispersion. Upper chamber 40 includes an opening at the top thereof and an opening at the bottom portion to provide fluid communication between upper chamber 40 and intermediate chamber 42. Upper chamber 40 further includes a conduit or nozzle 43 for directing liquid into pump 38 for forming a dispersion with the solid particulate introduced therein which liquid can be stored in reservoir 41. Upper chamber 40 can further include a second conduit 46 for intermittently delivering solids into upper chamber 40. In a most preferred embodiment, pump 38 is provided with a piston 48, as is best seen in FIG. 3, which provides relative motion between a position adjacent screen system 24 and a position removed from the adjacent position whereby solids are prevented from entering upper chamber 40. Movement of pump 38 between these positions is facilitated by flanged wheels 45, 47 rotatably attached to pump 38 by axles 44, 46. Two sets of wheels 45, 45a and 47, 47a are provided on each side of pump 38 as shown in FIG. 3, for rolling movement along a structural beam or rail (not shown). Piston 48 can be either mechanically or pneumatically actuated to move pump 38 to and from the aforedescribed positions. With this arrangement, solids can be delivered directly into reservoir portion 41 by sliding down ramp 29 of screening system 24.

As seen in FIG. 4, intermediate chamber 42 further includes a discharge conduit 50 for discharging the dispersion from pump 38. Still referring to FIG. 4, pump 38 further includes a lower chamber 52 which is in fluid communication with intermediate chamber 42. Lower chamber 52 further includes means for inducing a vortex in intermediate chamber 42, such as agitator 54. Agitator 54 further includes impeller blades 56a, 56b which are disposed within lower chamber 52. Rotation of impeller blades 56a, 56b within lower chamber 52 induces a vortex within intermediate chamber 42 and which precludes solids from entering lowering chamber 52 and which further causes the solids to be discharged out of pump 38 through discharge conduit 50. In accordance with this arrangement any solids, such as the carbon sorbent used in accordance with the present invention are discharged from pump 38 without being deleteriously affected, inasmuch as the solids are transferred from the pump without ever making contact with impeller blades 56a, 56b.

In a preferred embodiment intermediate chamber 42 includes a curved outer-crossed sectional portion 58 to facilitate the formation and rotation of the vortex and discharge conduit 50 is tangentially disposed with respect to curved portion 58.

In accordance with the method of the present invention, which is best appreciated by collectively referring to FIGS. 1, 2, and 3, slurry is first introduced into tank 12 via slurry entry means 14. Sorbent is introduced into tank 12 in any conventional manner, but is preferably introduced at the locus at arrow A, to create a pulp within tank 12 and further to enable the sorbent to contact the slurry.

Metal values are sorbed from the slurry in tank 12 by mixing the pulp, such as by actuating agitation means 18, which assures homogeneity between the sorbent and the slurry and which substantially uniformly distributes the sorbent throughout the slurry, thereby facilitating the sorption of the aurocyanide complex by the sorbent. Because of the continuous introduction of slurry via slurry entry means 14 accompanied by continuous introduction of sorbent, pulp level 16 is substantially maintained at all times.

A portion of the pulp is directed into screening system 24 where it becomes isolated from the pulp remaining in tank 12. After having been passed over screen member 28 the sorbent, now impregnated with metal values, is separated from the slurry by moving upwardly along the screen member 28 due to the vibration imparted thereto by motors 30a and 30b. The slurry of the pulp passes through the screen openings while the carbon sorbent is retained upon the screen member 28. The vibration urges the sorbent to move upwardly along the screen to ramp 29, where it can slide back into the pulp in tank 12 by the force of gravity.

The separated sorbent is returned into tank 12 on a substantially continuous basis for further adsorption; however, any portion of the sorbent can be removed from the screening system so that the metal values may be desorbed therefrom or to transfer the sorbent to another tank. It is most preferable to primarily return the separated sorbent into tank 12, while intermittently removing the portion of the sorbent from screening system 24. This is accomplished by urging the sorbent along screen member 28 in the manner hereinbefore described, and out of screening system 24 while pump 38 is advanced from a position removed from screening system 24 to a position proximate to the screening system so that the sorbent can be introduced into pump 38 sliding down ramp 29 due to the force of gravity for direct introduction into reservoir 41.

During the step of separating the sorbent from the slurry, the slurry passes through screen member 28, accumulates within housing 26 where it continues to remain isolated from the pulp in tank 12. The isolated slurry is removed from housing 26 by way of conduit means, such as pipe 60 and is preferably directed to a downstream tank for further treatment, which tank is in fluid communication with the upstream tank via pipe 60. Alternatively, when the gold values have been substantially adsorbed from the slurry, the slurry can be directed to a storage area, typically referred to as a tailings pond by those skilled in the art.

As the slurry is directed to one or more downstream vessels, the amount of metal values associated with the slurry is reduced inasmuch as the metal values are continuously being adsorbed therefrom. Accordingly, the amount of metal values associated with the sorbent is increased in each of the vessels as it is simultaneously directed therethrough.

In a preferred embodiment, sorbent is countercurrently directed through the vessels with respect to the advancement of slurry therethrough and, as such, the amount of metal values sorbed by the sorbent increases as it is countercurrently advanced from the last tank of the series in a upstream direction toward the first tank.

What is claimed is:

1. A sorption vessel comprising:
   a tank for holding a pulp including an aqueous slurry and a sorbent, said pulp being maintained at a predetermined level in said tank;
   means for separately introducing each one of pulp, slurry and sorbent into said tank;
   a screening system disposed with said tank and being at least partially submerged beneath said predetermined pulp level for creating a hydraulic differential between said screening system and said predetermined pulp level, said screening system comprising:
   (a) a housing for isolating said system from fluid contact with said pulp, and comprising means for providing said hydraulic differential between said predetermined pulp level and said screening system;
   (b) means for directing said pulp towards said screening system by said hydraulic differential; and
   (c) means disposed within said housing for selectively and continuously separating said sorbent from said slurry.

2. The vessel of claim 1 further comprising a pump for removing one of said sorbent or said pulp from said tank.

3. The vessel of claim 1 further comprising means for agitating said pulp to facilitate contact between said sorbent and said slurry, thereby increasing the degree of sorption of metal values from said slurry by said sorbent.

4. The vessel of claim 1 further comprising means for introducing said separated sorbent into said tank.

5. The vessel of claim 1 wherein said sorbent separating means includes a plurality of screen members which are angularly disposed in said housing with respect to said predetermined pulp level.

6. The vessel of claim 5 wherein said screening system includes means for vibrating said screen members to facilitate separation of said sorbent from said slurry.

7. The vessel of claim 1 wherein said sorbent separating means comprises a continuous linear screen to facilitate separation of said sorbent and said slurry from said pulp.

8. The vessel of claim 1 wherein the pulp directing means further comprises valve means for selectively introducing pulp into said screening system.

9. The vessel of claim 1 wherein said tank includes at least one baffle to assist in the direction of movement of said pulp in said tank.

10. A sorption vessel comprising:
    a tank for retaining a pulp of an aqueous slurry and a sorbent at a predetermined pulp level therein;
    means for separately introducing each one of pulp, slurry and sorbent into said tank;
    a screening system disposed within said tank and at least partially submerged beneath said predetermined pulp level for creating a hydraulic differential, said screening system comprising:
    (a) a housing for isolating said system from fluid contact with said pulp, and comprising means for providing said hydraulic differential between said predetermined pulp level and said screening system,
    (b) means disposed within said housing for selectively and continuously separating said sorbent from said slurry; and
    (c) a conduit for selectively introducing said pulp into said screening system, said pulp being urged through said conduit by said hydraulic differential.

11. The vessel of claim 10 wherein a plurality of screening systems are included in said tank.

12. The vessel of claim 10 further comprising a pump for removing one of said sorbent or said pulp from said tank.

13. The vessel of claim 10 wherein the sorbent is active carbon.

14. The vessel of claim 10 wherein said sorbent separating means comprises a continuous linear screen to facilitate separation of said sorbent and said slurry from said pulp.

15. The vessel of claim 10 further comprising means introducing additional slurry into an upper portion of said tank.

16. The vessel of claim 10 further comprising one or more spargers for introducing air into said pulp.

17. The vessel of claim 10 further comprising means for agitating said pulp to facilitate contact between said sorbent and said aqueous slurry, thereby increasing the degree of sorption of metal values from said slurry by said sorbent.

18. The vessel of claim 17 wherein one end of said conduit extends to a lower portion of said tank and directs said pulp to said screening system.

19. The vessel of claim 18 wherein the opposite end of said conduit includes a distribution box member for uniformly distributing said pulp into the screening system.

20. The vessel of claim 10 wherein said sorbent separating means includes a plurality of screen members which are angularly disposed in said housing with respect to said predetermined pulp level.

21. The vessel of claim 20 wherein said screening system includes means for vibrating said screen members to facilitate separation of said sorbent from said slurry.

22. A sorption vessel comprising:
a tank for retaining pulp of an aqueous slurry and a sorbent at a predetermined pulp level therein;
means for separately introducing each one of pulp, slurry and sorbent into said tank;
a screening system disposed within said tank and at least partially submerged beneath said predetermined pulp level for creating a hydraulic differential between said screening system and said predetermined pulp level, said screening system comprising:
(a) a housing for isolating said system from fluid contact with said pulp, and comprising means for providing said hydraulic differential between said predetermined pulp level and said screening system;
(b) at least one screen member disposed within said housing for selectively and continuously separating said sorbent from said slurry;
(c) a conduit for selectively introducing said pulp onto said at least one screen member, said pulp being urged through said conduit by said hydraulic differential;
(d) means for returning said separated sorbent to said tank; and
(e) means for removing said separated slurry from said screening system.

23. The vessel of claim 22 further comprising a pump for removing said separated sorbent from said tank and further wherein said separated slurry removing means comprises a drainage member extending from a lower portion of said screening system housing through a wall of said tank.

24. The vessel of claim 23 wherein said pump intermittently removes said separated sorbent from said tank.

25. The vessel of claim 24 wherein said pump is periodically placed adjacent said screening system so that separated sorbent drops into a reservoir of said pump.

26. The vessel of claim 22 wherein a plurality of screen members are used, said screen members being angularly disposed in said housing with respect to said predetermined pulp level.

27. The vessel of claim 26 wherein said screening system includes means for vibrating said screen members to facilitate separation of said sorbent from said slurry.

28. The vessel of claim 22 wherein one end of said conduit extends to a lower portion of said tank and directs said pulp to said screening system.

29. The vessel of claim 28 wherein the opposite end of said conduit includes a distribution box member for uniformly distributing said pulp into the screening system.

* * * * *